US012561944B2

(12) United States Patent　　(10) Patent No.:　US 12,561,944 B2
Iwami　　(45) Date of Patent:　Feb. 24, 2026

(54) POINT CLOUD DATA PROCESSING APPARATUS, POINT CLOUD DATA PROCESSING METHOD, AND PROGRAM

(71) Applicant: FUJIFILM Corporation, Tokyo (JP)

(72) Inventor: Kazuchika Iwami, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 611 days.

(21) Appl. No.: 17/931,878

(22) Filed: Sep. 13, 2022

(65) Prior Publication Data

US 2023/0011921 A1　　Jan. 12, 2023

Related U.S. Application Data

(63) Continuation of application No. PCT/JP2021/007592, filed on Mar. 1, 2021.

(30) Foreign Application Priority Data

Mar. 30, 2020　(JP) ................................. 2020-060463

(51) Int. Cl.
　*G06V 10/75*　　(2022.01)
　*G01S 7/48*　　(2006.01)
　　　(Continued)

(52) U.S. Cl.
　CPC .......... G06V 10/757 (2022.01); G01S 7/4802 (2013.01); G06V 10/22 (2022.01); G06V 10/46 (2022.01)

(58) Field of Classification Search
　CPC ...... G06V 10/757; G06V 10/46; G06V 10/22; G06V 2201/12; G06V 7/73; G06V 10/82;
　　　(Continued)

(56) References Cited

U.S. PATENT DOCUMENTS

| | | | | | |
|---|---|---|---|---|---|
| 2015/0003723 | A1* | 1/2015 | Huang | ................. | G06V 20/653 |
| | | | | | 382/154 |
| 2015/0254499 | A1* | 9/2015 | Pang | .................... | G06V 20/647 |
| | | | | | 382/103 |
| 2019/0370614 | A1* | 12/2019 | Crouch | .................. | G06V 20/56 |

FOREIGN PATENT DOCUMENTS

| | | |
|---|---|---|
| CN | 104024793 A | 9/2014 |
| CN | 104835141 A | 8/2015 |

(Continued)

OTHER PUBLICATIONS

Wang, Z., Jing, F., Fan, J., Liu, Z., Tian, Y., & Gao, Z. Object Pose Estimation Based on RGB-D Sensor for Cooperative Spray Painting Robot. 2019 IEEE 9th Annual International Conference on Cyber Technology in Automation, Control, and Intelligent Systems (Cyber), 311-316. (Year: 2019).*

(Continued)

*Primary Examiner* — Stephen R Koziol
*Assistant Examiner* — Michael Kim Maiden
(74) *Attorney, Agent, or Firm* — Studebaker Brackett PLLC

(57)　　　　ABSTRACT

A point cloud data processing apparatus 11 includes a processor configured to acquire first form information that indicates a feature of a form of a first object, specify an object region of a second object that is identified from an image and that corresponds to the first form information, select second-object point cloud data, in point cloud data, that corresponds to the object region, on the basis of the object region, acquire second form information that indicates a feature of a form of the second object, on the basis of the second-object point cloud data, and compare the first form information with the second form information and perform determination as to whether the second object is the first object.

16 Claims, 7 Drawing Sheets

(51) Int. Cl.
G06V 10/22 (2022.01)
G06V 10/46 (2022.01)
(58) Field of Classification Search
CPC ....... G06V 20/64; G01S 7/4802; G01S 17/86;
G01S 17/89; G06T 2207/10004; G06T
2207/10024; G06T 2207/10028
See application file for complete search history.

(56) References Cited

FOREIGN PATENT DOCUMENTS

| | | | |
|---|---|---|---|
| JP | 2003-76994 | A | 3/2003 |
| JP | 2003-194530 | A | 7/2003 |
| JP | 2004-294234 | A | 10/2004 |
| JP | 2012-83157 | A | 4/2012 |
| JP | 2019-007744 | A | 1/2019 |
| JP | 2019-168226 | A | 10/2019 |

OTHER PUBLICATIONS

Wang, Z., Jing, F., Fan, J., Liu, Z., Tian, Y., & Gao, Z. (2019). Object Pose Estimation Based on RGB-D Sensor for Cooperative Spray Painting Robot. 2019 IEEE 9th Annual International Conference on Cyber Technology in Automation, Control, and Intelligent Systems (Cyber), 311-316. (Year: 2019).*
Communication pursuant to Article 94(3) EPC issued by the European Patent Office on Jul. 24, 2024, which corresponds to European Patent Application No. 21779828.9-1207 and is related to U.S. Appl. No. 17/931,878.
Anonymous, "The Rigid Iterative Closest Point Algorithm", Nov. 16, 2001, XP093185276, retrieved from the internet: https://homepages.inf.ed.ac.uk/rbf/CVonline/LOCAL_COPIES/FISHER/ICP/cvoicp.htm, total 2 pages.
Cyrill Stachniss, "Point-to-Plane and Generalized ICP—5 Minutes with Cyrill", May 17, 2021, XP093185279, retrieved from the internet: https://www.youtube.com/watch?v=2hC9IG6MFD0, total 2 pages.
Maurer T. et al., "Performance of Geometrix ActiveIDÔTM 3D Face Recognition Engine on the FRGC Data", Proceedings/2005 IEEE Computer Society Conference on Computer Vision and Pattern Recognition (CVPR 2005), San Diego, CA, USA, Jun. 25, 2005, p. 154, XP031259799.
The extended European search report issued by the European Patent Office on May 23, 2023, which corresponds to European Patent Application No. 21779828.9-1207 and is related to U.S. Appl. No. 17/931,878.
Wang Zhe et al., "Object Pose Estimation Based on RGB-D Sensor for Cooperative Spray Painting Robot", 2019 IEEE 9th Annual International Conference on Cyber Technology in Automation, Control, and Intelligent Systems (Cyber), Jul. 29, 2019, pp. 311-316, IEEE, doi: 10.1109/CYBER46603.2019.9066564.
An Office Action; "Notice of Reasons for Refusal," mailed by the Japanese Patent Office on Feb. 8, 2024, which corresponds to Japanese Patent Application No. 2022-511670 and is related to U.S. Appl. No. 17/931,878; with English language translation.
"Decision for Refusal" Office Action issued in JP 2022-511670; mailed by the Japanese Patent Office on Aug. 28, 2024.
International Search Report issued in PCT/JP2021/007592; mailed May 11, 2021.
International Preliminary Report on Patentability issued in PCT/JP2021/007592; issued Sep. 29, 2022.
An Office Action; mailed by the China National Intellectual Property Administration of the People's Republic of China on Jul. 8, 2025, which corresponds to Chinese Patent Application No. 20180022462.1 and is related to U.S. Appl. No. 17/931,878.
Communication pursuant to Article 94(3) EPC issued by the European Patent Office on Nov. 13, 2025, which corresponds to European Patent Application No. 21779828.9-1218 and is related to U.S. Appl. No. 17/931,878.
Liu Bing et al., "A Fast Weighted Registration Method of 3D Point Cloud Based on Curvature Feature", E-Business, Management and Economics, ACM, NY, USA, Mar. 16, 2018, pp. 83-87, DOI: 10.1145/3195588.3195595, XP059923099.
Liu Yilin et al., "Curvature feature extraction based ICP points cloud registration method", Proceedings of SPIE; [Proceedings of SPIE; ISSN 0277-786X; vol. 8615], SPIE, WA, USA, vol. 10817, Nov. 8, 2018, pp. 1081707-1 to 1081707-8, DOI: 10.1117/12.2500825, XP060114179.

* cited by examiner

FIG. 6

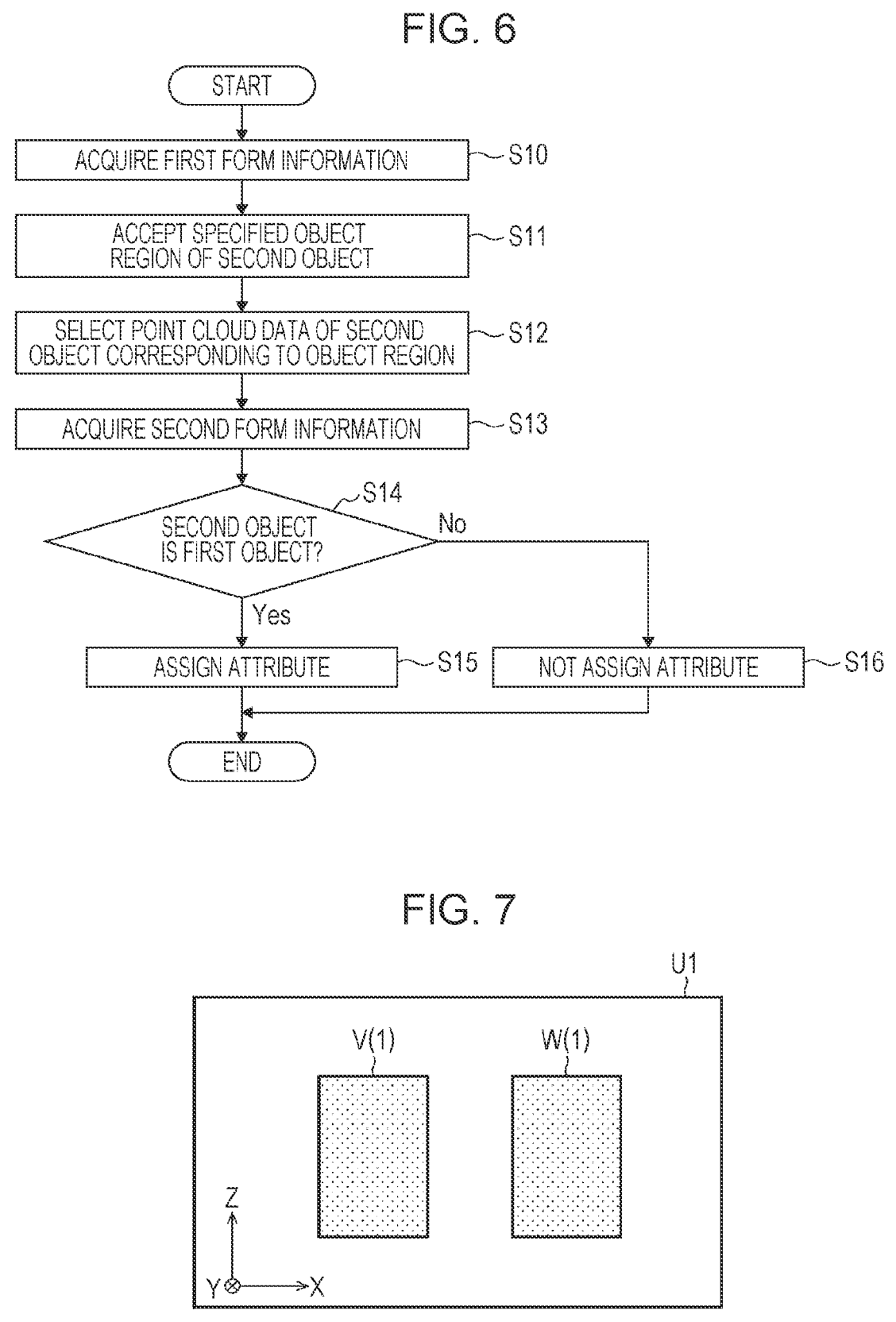

START

ACQUIRE FIRST FORM INFORMATION — S10

ACCEPT SPECIFIED OBJECT
REGION OF SECOND OBJECT — S11

SELECT POINT CLOUD DATA OF SECOND
OBJECT CORRESPONDING TO OBJECT REGION — S12

ACQUIRE SECOND FORM INFORMATION — S13

S14
SECOND OBJECT
IS FIRST OBJECT?

No

Yes

ASSIGN ATTRIBUTE — S15    NOT ASSIGN ATTRIBUTE — S16

END

POINT CLOUD DATA PROCESSING APPARATUS, POINT CLOUD DATA PROCESSING METHOD, AND PROGRAM

CROSS-REFERENCE TO RELATED APPLICATIONS

This application is a Continuation of PCT International Application No. PCT/JP2021/007592 filed on Mar. 1, 2021, which claims priority under 35 U.S.C. § 119(a) to Japanese Patent Application No. 2020-060463 filed on Mar. 30, 2020. Each of the above application(s) is hereby expressly incorporated by reference, in its entirety, into the present application.

BACKGROUND OF THE INVENTION

1. Field of the Invention

The present invention relates to a point cloud data processing apparatus, a point cloud data processing method, and a non-transitory computer recording medium storing a program.

2. Description of the Related Art

A technique using, for example, a laser scanner is known in which reflection on the surface of an object is used to acquire point cloud data constituted by a large number of points each having three-dimensional information of the surface of the object. Pieces of point data that constitute the point cloud data of the object acquired by using, for example, a laser scanner can be made to correspond to pixels that constitute a captured image of the same object. JP2012-83157A describes a technique in which the region of a marker is specified on an image captured with a camera, point cloud data that corresponds to the region is extracted, and the position and size of the marker present in the image are determined on the basis of the extracted point cloud data.

SUMMARY OF THE INVENTION

As in the technique described in JP2012-83157A, a case of specifying, on an image, a region in which a detection target object (a marker in the technique described in JP2012-83157A) is present is considered. In a case of specifying a detection target object on an image, it may be difficult to accurately specify a region in which the object that is a desired detection target is present because the image is two-dimensional information. For example, regarding an image that is two-dimensional information, information about the depth direction in three-dimensional information is lost, and therefore, it may be difficult to distinguish a cylinder and a cube from each other depending on the viewpoint of the image. JP2012-83157A does not mention such a problem of specifying a region on an image.

The present invention has been made in view of the above-described circumstances, and an object thereof is to provide a point cloud data processing apparatus, a point cloud data processing method, and a program with which, in a case of specifying the region of a detection target object on an image, whether the result of specification is correct or wrong can be known and the result of specification can be effectively used.

To achieve the above-described object, a point cloud data processing apparatus according to an aspect of the present invention is a point cloud data processing apparatus including: a memory configured to store an image of a first object that is a detection target and that is a photographic subject and point cloud data that includes a large number of points on a surface of the first object and that represents at least three-dimensional information, with positions of pixels that constitute the image being associated with pieces of point data that constitute the point cloud data; and a processor, the processor being configured to acquire first form information that indicates a feature of a form of the first object, specify an object region of a second object that is identified from the image and that corresponds to the first form information, select second-object point cloud data, in the point cloud data, that corresponds to the object region, on the basis of the object region, acquire second form information that indicates a feature of a form of the second object, on the basis of the second-object point cloud data, and compare the first form information with the second form information and perform determination as to whether the second object is the first object.

According to this aspect, the first form information that indicates a feature of the form of the first object that is the detection target is acquired, the second-object point cloud data that corresponds to the object region of the second object identified from the image and corresponding to the first form information is selected, and the second form information is acquired on the basis of the second-object point cloud data. According to this aspect, the first form information is compared with the second form information to thereby perform determination as to whether the second object specified on the image is the first object that is the detection target, and therefore, whether the result of specifying the region is correct or wrong can be known, and the result of specifying the region can be effectively used.

Preferably, the processor is configured to assign an attribute to the second-object point cloud data on the basis of a result of the determination.

Preferably, the processor is configured to cause a display unit to display a result of the determination.

Preferably, the first form information is at least one of information about a type of the form of the first object, information about the surface of the first object, or information about a size of the first object. Preferably, the form of the first object is a cylindrical form.

Preferably, the processor is configured to acquire the second form information on the basis of the second-object point cloud data by at least one of a Hough transformation process, a RANSAC algorithm, or a detector subjected to machine teaming. Preferably, the first object is piping.

A point cloud data processing method according to another aspect of the present invention is a point cloud data processing method using a point cloud data processing apparatus including: a memory configured to store an image of a first object that is a detection target and that is a photographic subject and point cloud data that includes a large number of points on a surface of the first object and that represents at least three-dimensional information, with positions of pixels that constitute the image being associated with pieces of point data that constitute the point cloud data; and a processor, the processor being configured to perform a step of acquiring first form information that indicates a feature of a form of the first object, a step of specifying an object region of a second object that is identified from the image and that corresponds to the first form information, a step of selecting second-object point cloud data, in the point cloud data, that corresponds to the object region, on the basis of the object region, a step of acquiring second form information that indicates a feature of a form of the second object, on the basis of the second-object point cloud data, and a step of comparing the first form information with the second form information and performing determination as to whether the second object is the first object.

A non-transitory computer recording medium storing a program according to another aspect of the present invention is a program for causing a point cloud data processing apparatus to perform a point cloud data processing method, the point cloud data processing apparatus including: a memory configured to store an image of a first object that is a detection target and that is a photographic subject and point cloud data that includes a large number of points on a surface of the first object and that represents at least three-dimensional information, with positions of pixels that constitute the image being associated with pieces of point data that constitute the point cloud data; and a processor, the program causing the processor to perform a step of acquiring first form information that indicates a feature of a form of the first object, a step of specifying an object region of a second object that is identified from the image and that corresponds to the first form information, a step of selecting second-object point cloud data, in the point cloud data, that corresponds to the object region, on the basis of the object region, a step of acquiring second form information that indicates a feature of a form of the second object, on the basis of the second-object point cloud data, and a step of comparing the first form information with the second form information and performing determination as to whether the second object is the first object.

According to the present invention, the first form information is compared with the second form information to thereby perform determination as to whether the region specified on the image corresponds to the first object that is the detection target, and therefore, determination as to whether the result of specifying the region is correct or wrong can be performed, and the result of specifying the region can be effectively used.

BRIEF DESCRIPTION OF THE DRAWINGS

FIG. 6 is a flowchart illustrating a point cloud data processing method;

FIG. 7 is a diagram illustrating a case where object regions are specified;

FIG. 10 is a diagram for explaining cylinder detection performed by using the RANS AC algorithm.

DESCRIPTION OF THE PREFERRED EMBODIMENTS

Hereinafter, a preferred embodiment of a point cloud data processing apparatus, a point cloud data processing method, and a program according to the present invention will be described with reference to the attached drawings.

First, a case where the present invention is effectively applied will be described. In a case of specifying a detection target object having a three-dimensional form from an image that is two-dimensional data, erroneous detection may occur because of dimensionality reduction of the image.

Figures 1A, 1B:
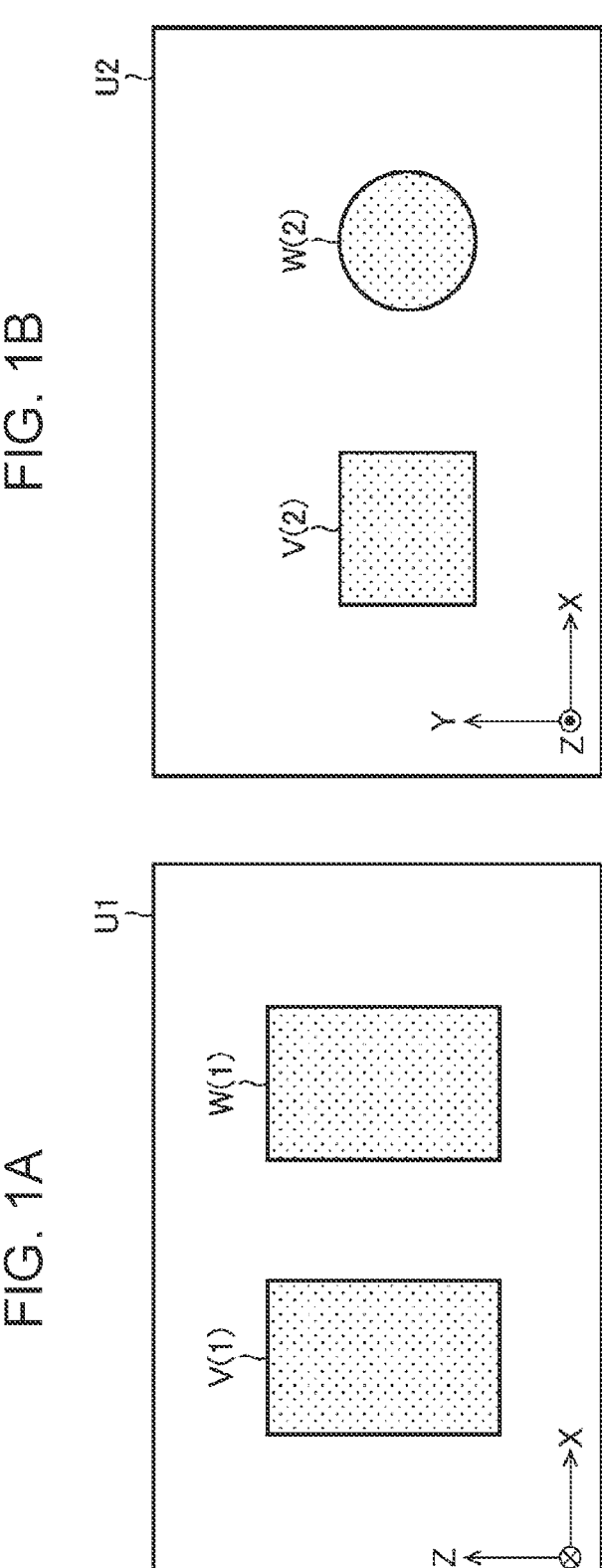
FIGS. 1A and 1B are diagrams illustrating images of objects captured from different viewpoints.

FIGS. 1A and 1B are diagrams illustrating an image U1 and an image U2 of an object V having a rectangular parallelepiped form and an object W having a cylindrical form captured from different viewpoints. A description of a case of detecting an object (first object) having a cylindrical form, such as piping or a pipe, will be given below.

FIG. 1A illustrates the image U1 acquired by image capturing of the X-Z plane of the object V and the object W, and FIG. 1B illustrates the image U2 acquired by image capturing of the X-Y plane of the object V and the object W.

Although the object V and the object W have different forms, the object V and the object W are present as the same rectangular regions (object region V(1) and object region W(1)) on the image U1 illustrated in FIG. 1A. Therefore, in a case of manually or automatically identifying the object V and the object W on the basis of the image U1, the object region V(1) and the object region W(1) may be identified as the regions of objects having the same forms. However, the image U2 illustrated in FIG. 1B shows an object region V(2) and an object region W(2) having different shapes, and the object V and the object W are found to have different forms.

In the case of detecting an object having a cylindrical form, the object V and the object W may be identified as having cylindrical forms on the basis of the image U1, and the respective regions (object region V(1) and object region W(1)) may be specified on the image U1. In this case, the object W has a cylindrical form and the object region W(1) is appropriately detected; however, the object V has a rectangular parallelepiped form and the object region V(1) is erroneously detected and specified. Accordingly, it is not possible to effectively use the result of specification that includes a case where, for example, the region of an object that is not the detection target is erroneously specified. Therefore, the present invention proposes a technique in which identification is made on the basis of the image U1 as described above and determination as to whether the specified regions are correct or wrong is performed.

Figure 2:
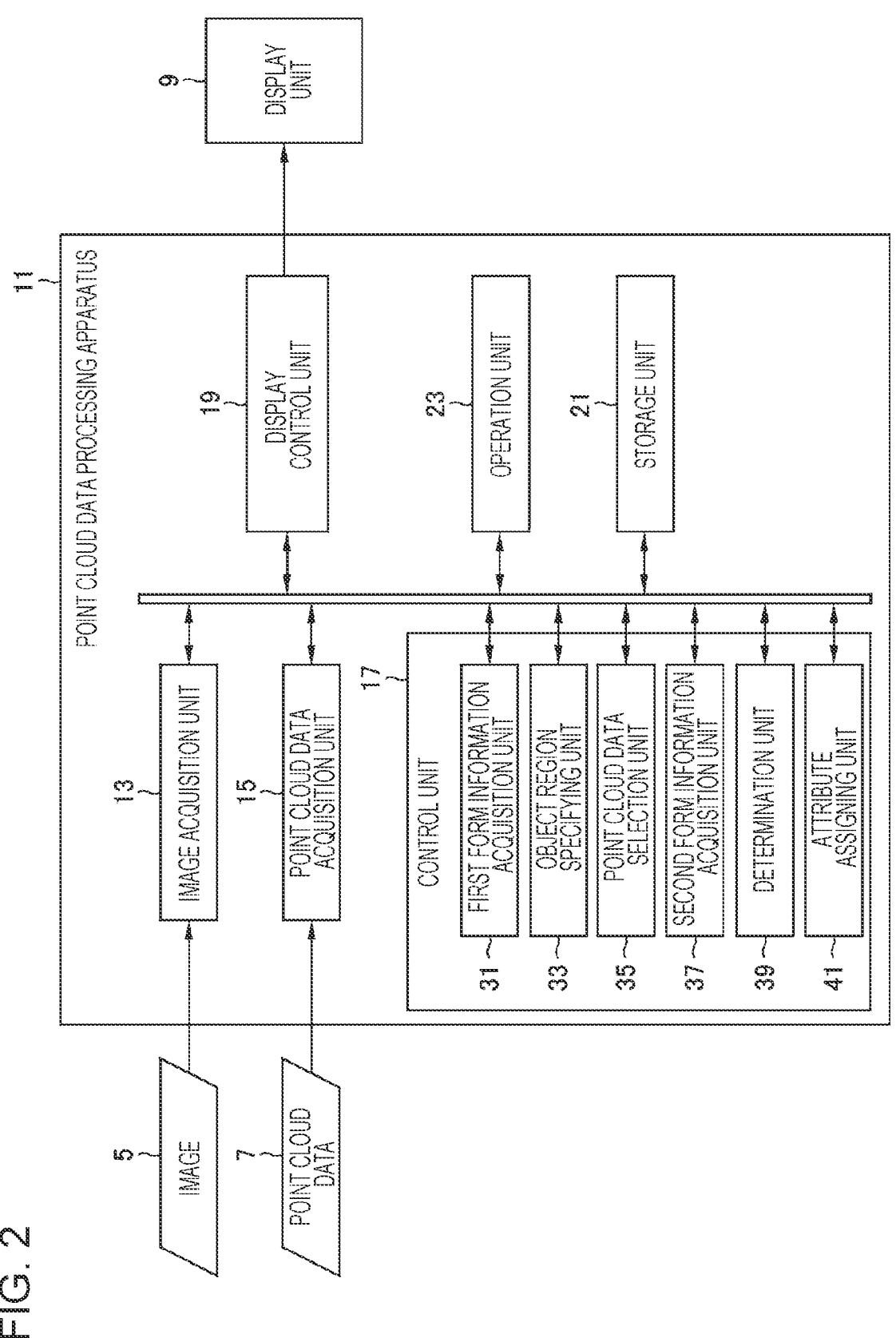
FIG. 2 is a block diagram illustrating a functional configuration example of a point cloud data processing apparatus.

FIG. 2 is a block diagram illustrating a functional configuration example of a point cloud data processing apparatus 11 according to the present invention. The point cloud data processing apparatus 11 is formed of, for example, a computer. The point cloud data processing apparatus 11 may be mounted in a three-dimensional measuring device 1 (see FIG. 3) or may be formed of a computer separate from the three-dimensional measuring device 1.

The point cloud data processing apparatus 11 includes an image acquisition unit 13, a point cloud data acquisition unit 15, a control unit 17, a display control unit 19, an operation unit 23, and a storage unit (memory) 21. Although not illustrated, the point cloud data processing apparatus 11 includes a hardware configuration included in a typical computer.

The image acquisition unit 13 acquires an image 5 obtained by capturing, as a photographic subject, a first object that is a detection target. The image acquisition unit 13 is formed of a data input unit of the computer. The point cloud data acquisition unit 15 acquires point cloud data that represents three-dimensional information including a large number of points on the surface of the first object that is the detection target. The image acquisition unit 13 and the point cloud data acquisition unit 15 are formed of the data input unit of the computer.

Here, the positions of respective pixels that constitute the image 5 correspond to pieces of three-dimensional information of respective pieces of point data that constitute point cloud data 7. The point cloud data 7 is constituted by a large number of points, and each of the points has a piece of three-dimensional information (three-dimensional coordinates) of a position of reflection on the surface of the object. The correspondence relationship between the image 5 and the point cloud data 7 will be described in detail below.

The control unit 17 is implemented by a CPU (processor) (central processing unit) (not illustrated) that is mounted in the computer executing a program stored in, for example, the storage unit 21.

The control unit 17 includes a first form information acquisition unit 31, an object region specifying unit 33, a point cloud data selection unit 35, a second form information acquisition unit 37, a determination unit 39, and an attribute assigning unit 41.

The display control unit 19 is implemented by the CPU executing a program stored in the storage unit 21. The display control unit 19 controls display on a display unit 9. For example, on the display unit 9, point cloud data or an image is displayed. On the display unit 9, the result of determination by the determination unit 39 can be displayed to give the user a notification.

The storage unit 21 stores the image 5 acquired by the image acquisition unit 13 and the point cloud data 7 acquired by the point cloud data acquisition unit 15. The storage unit 21 stores various programs that are executed by the CPU in order to implement various functions of the point cloud data processing apparatus 11.

The operation unit 23 is formed of a keyboard, a mouse, which is an example of a pointing device, and so on. The user inputs various commands to the point cloud data processing apparatus 11 via the operation unit 23.

Figures 3, 4:
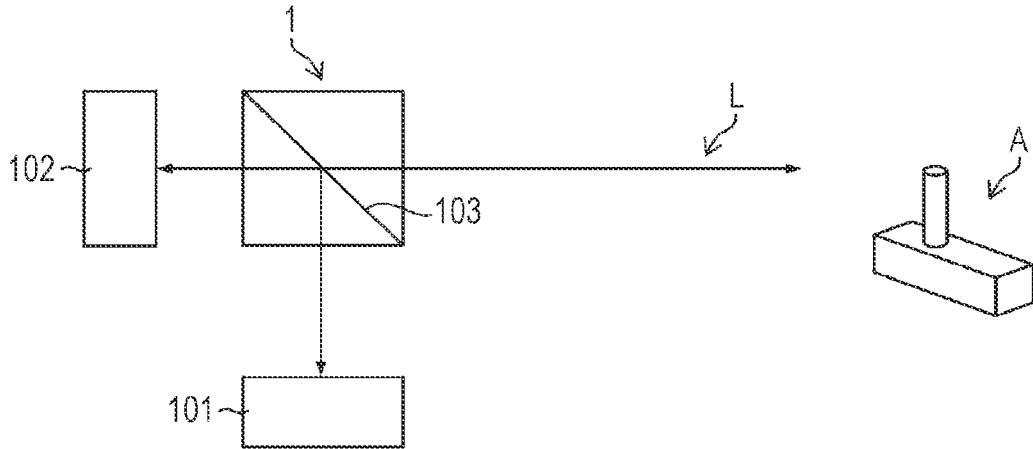
FIG. 3 is a schematic diagram illustrating an aspect in which an image and point cloud data to be input to the point cloud data processing apparatus are acquired by a three-dimensional measuring device 1.
FIG. 4 is a schematic diagram for explaining a laser scanner and an image capturing device mounted in the three-dimensional measuring device.

FIG. 3 is a schematic diagram illustrating an aspect in which the image 5 and the point cloud data 7 to be input to the point cloud data processing apparatus 11 are acquired by the three-dimensional measuring device 1. FIG. 4 is a schematic diagram for explaining a laser scanner 101 and an image capturing device (camera) 102 mounted in the three-dimensional measuring device 1.

As illustrated in FIG. 3, the three-dimensional measuring device 1 acquires the point cloud data 7 of an object A that is a measurement target and the image 5 of the object A acquired by image capturing.

The three-dimensional measuring device 1 is of a time-of-flight type in which the distance is measured based on the time from when the laser scanner 101 (see FIG. 4) mounted therein emits a laser pulse to when the laser pulse is reflected on the surface of the object A that is a measurement target and returns. The laser scanner 101 acquires angle information of the emission direction of the laser pulse (FIG. 3 illustrates a horizontal direction α and a vertical direction β) with reference to the center of rotation of the laser scanner 101. The laser scanner 101 acquires three-dimensional information of the reflection point of the laser pulse on the basis of the measured distance and the angle information of the emission direction of the laser pulse. The laser scanner 101 acquires pieces of three-dimensional information of a large number of points while changing the horizontal direction α and the vertical direction β that define the emission direction of the laser pulse, by a predetermined pitch. The laser scanner 101 need not be of a time-of-flight type and may be one that acquires point cloud data with a phase difference method or a trigonometry method.

The three-dimensional measuring device 1 acquires the image 5 with the image capturing device 102 (see FIG. 4) mounted therein and having an optical axis L. The image capturing device 102 includes, for example, a CCD (charge-coupled device) imaging element (not illustrated). The imaging element has a plurality of pixels that are formed of photoelectric elements arranged two-dimensionally, namely, in an x direction (horizontal direction) and a y direction (vertical direction), and includes, for example, a color filter (not illustrated), in which R (red), G (green), and B (blue) filters are arranged two-dimensionally in the Bayer arrangement, on the top surface of the plurality of pixels. The image capturing device 102 is used to acquire the image 5 that is a color image. Note that the image 5 acquired by the image capturing device 102 need not be a color image and may be a monochrome image.

In the example illustrated in FIG. 4, a half mirror 103 is used, and the laser scanner 101 and the image capturing device 102 are disposed so as to have the same optical axis L. Note that the positional relationship between the laser scanner 101 and the image capturing device 102 needs to be a known relationship and is not limited to a specific relationship. For example, the image capturing device 102 may be placed on top of the laser scanner 101 without having the same optical axis. The three-dimensional measuring device 1 can acquire the point cloud data 7 and the image 5 simultaneously or serially. To make pixels that constitute the image 5 and pieces of point data that constitute the point cloud data 7 have corresponding positional relationships, the laser scanner 101 and the image capturing device 102 need to have in advance a known positional relationship, and the disposition of the laser scanner 101 and the image capturing device 102 is not limited to that illustrated in FIG. 4. For example, the image capturing device 102 may be disposed in the upper part of the laser scanner 101 without providing the half mirror 103 so as to have the same image capturing direction.

Figure 5:
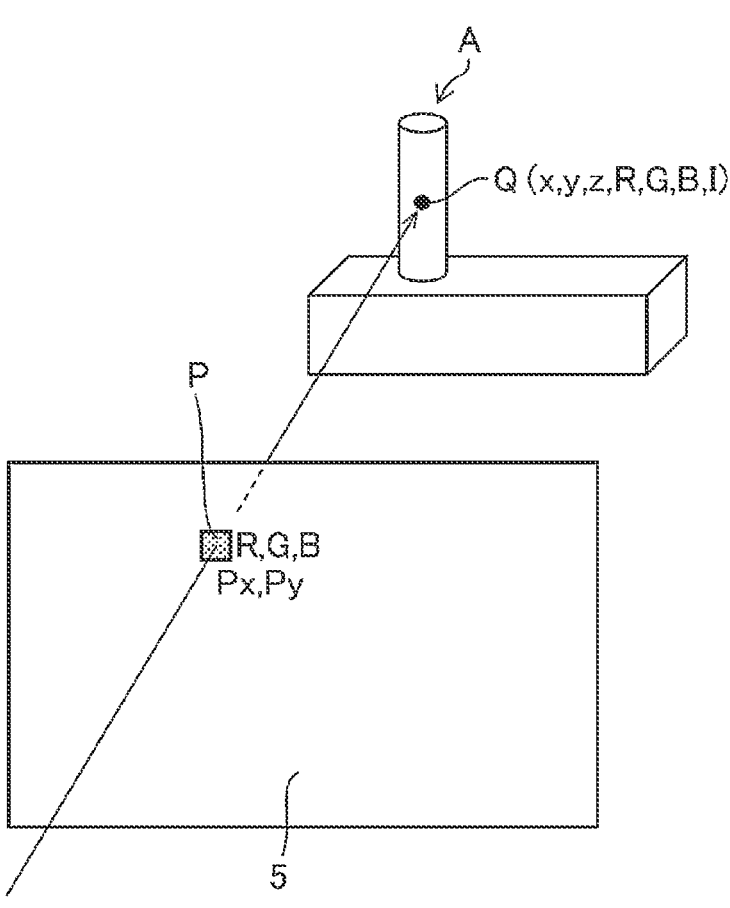
FIG. 5 is a schematic diagram for explaining that an image and point cloud data have a corresponding positional relationship.

FIG. 5 is a schematic diagram for explaining that the image 5 and the point cloud data 7 have a corresponding positional relationship. The image 5 is image data in which pixels P are arranged in two dimensions. The image 5 is a color image, and therefore, the pixels P each have values of R, G, and B. FIG. 5 illustrates a pixel P having coordinates (Px, Py) on the image 5 and a piece of point data Q having a corresponding positional relationship with the pixel P. A plurality of pieces of point data Q constitute the point cloud data 7 and each have information including three-dimensional coordinates (x, y, z) that correspond to positional information, the R, G, and B values of the corresponding pixel P, and the reflection intensity (I) of the laser of the laser scanner 101. The correspondence relationship between the pixel P and the piece of point data Q can be acquired because the positional relationship between the laser scanner 101 and the image capturing device 102 are known as described with reference to FIG. 4.

As described above, the pixels P that constitute the image 5 and the pieces of point data Q that constitute the point cloud data 7 have corresponding positional relationships, and the image 5 and the point cloud data 7 are stored in the storage unit 21 of the point cloud data processing apparatus 11 in association with each other while retaining the above-described positional relationship.

Next, the point cloud data processing method using the point cloud data processing apparatus 11 (and the program for causing the point cloud data processing apparatus 11 to perform the point cloud data processing method) will be described. Note that the image 5 and the point cloud data 7 are stored in advance in the storage unit 21 of the point cloud data processing apparatus 11.

FIG. 6 is a flowchart illustrating the point cloud data processing method. First, a series of steps that constitute the point cloud data processing method will be described, and subsequently, the details of each of the steps will be described.

The first form information acquisition unit 31 acquires first form information (first form information acquisition step: step S10). The first form information is information indicating features of the form of a first object that is a detection target. Next, the object region specifying unit 33 specifies the object region of a second object on the image (object region specifying step: step S11). The object region of the second object is a region on the image 5 in which the second object that is identified, from the image 5, as having features of the form indicated by the first form information is present. Subsequently, the point cloud data selection unit 35 selects in the point cloud data 7, on the basis of the object region, second-object point cloud data that corresponds to the object region (point cloud data selection step: step S12). Next, the second form information acquisition unit 37 acquires second form information that indicates features of the form of the second object, on the basis of the second-object point cloud data (second form information acquisition step: step S13). Subsequently, the determination unit 39 compares the first form information with the second form information to determine whether the second object is the first object (determination step: step S14). Subsequently, the attribute assigning unit 41 assigns an attribute to the second-object point cloud data on the basis of the result of determination. The attribute assigning unit 41 assigns an attribute to the selected point cloud data in a case where the second object is the first object (attribute assigning step: step S15), or does not assign an attribute to the selected point cloud data in a case where the second object is not the first object (attribute assigning step: step S16).

Next, a description of each of the steps described above will be given. In the following description, a case where an object having a cylindrical form is detected from the object V and the object W in the image U1 described with reference to FIG. 1 will be described.

First Form Information Acquisition Step

The first form information acquisition step is performed by the first form information acquisition unit 31. First form information is information indicating features of the form of a first object that is a detection target, and the detection target has been specified prior to detection, and therefore, the first form information has been specified. The first form information acquisition unit 31 acquires the first form information stored in the storage unit 21 or acquires the first form information input by the user via the operation unit 23.

The first form information is not limited to specific information as long as the first form information is information indicating features of the form of the first object that is the detection target. The first form information is preferably information that indicates three-dimensional features of the form of the first object. For example, the first form information includes at least one of information about the type of the form of the first object, information about the surface of the first object, or information about the size of the first object. The information about the type of the form of the first object is information indicating that, for example, the first object has a cylindrical form, a rectangular parallelepiped form, or a spherical form. The information about the surface of the first object is, for example, the surface roughness of the first object. The information about the size of the first object is, in a case where the first object has a cylindrical form, information about the size indicating features of the form of the first object, such as the maximum curvature, the radius, the height, and the volume.

In an example of detecting the object V having a cylindrical form described below, as the first form information indicating features of the form of the object V, "cylindrical form" is acquired.

Object Region Specifying Step

The object region specifying step is performed by the object region specifying unit 33. The object region specifying unit 33 specifies an object region in which an object (second object) that is identified on the image U1 and that corresponds to the first form information is present.

FIG. 7 is a diagram illustrating a case where the object region V(1) and the object region W(1) are specified on the image U1 on the basis of the first form information "cylindrical form".

The object region specifying unit 33 specifies object regions with various methods. For example, the object region specifying unit 33 is formed of a detector subjected to learning using deep learning, and specifies the object region V(1) or the object region W(1) by performing segmentation on the image U1. Note that for the segmentation, an existing model, such as FCN (Fully Convolutional Network), SegNet, or Pix2Pix, may be used, or a model that corresponds to the way of specifying object regions by the object region specifying unit 33 may be separately created. Learning by the detector that forms the object region specifying unit 33 may be performed by using deep learning or by using machine learning in a broad sense.

The object region specifying unit 33 may specify the object region V(1) and the object region W(1) on the basis of a command input by the user via the operation unit 23. For example, the user may fill the object region V(1) and the object region W(1) on the image U1 by using the operation unit 23 to thereby input a command, and the object region specifying unit 33 may specify the object region V(1) and the object region W(1) on the basis of the command. The user may specify the inner part of the object region V(1) and that of the object region W(1) on the image U1 by using the operation unit 23, and the object region specifying unit 33 may determine textures on the image U1 by image processing on the basis of the specification and specify the object region V(1) and the object region W(1).

Point Cloud Data Selection Step

The point cloud data selection step is performed by the point cloud data selection unit 35. Each pixel that constitutes the image U1 corresponds to a piece of point data that constitutes the point cloud data. Therefore, the point cloud data selection unit 35 selects point cloud data corresponding to pixels that constitute the object region V(1) and point cloud data corresponding to pixels that constitute the object region W(1) specified by the object region specifying unit 33.

Figure 8:
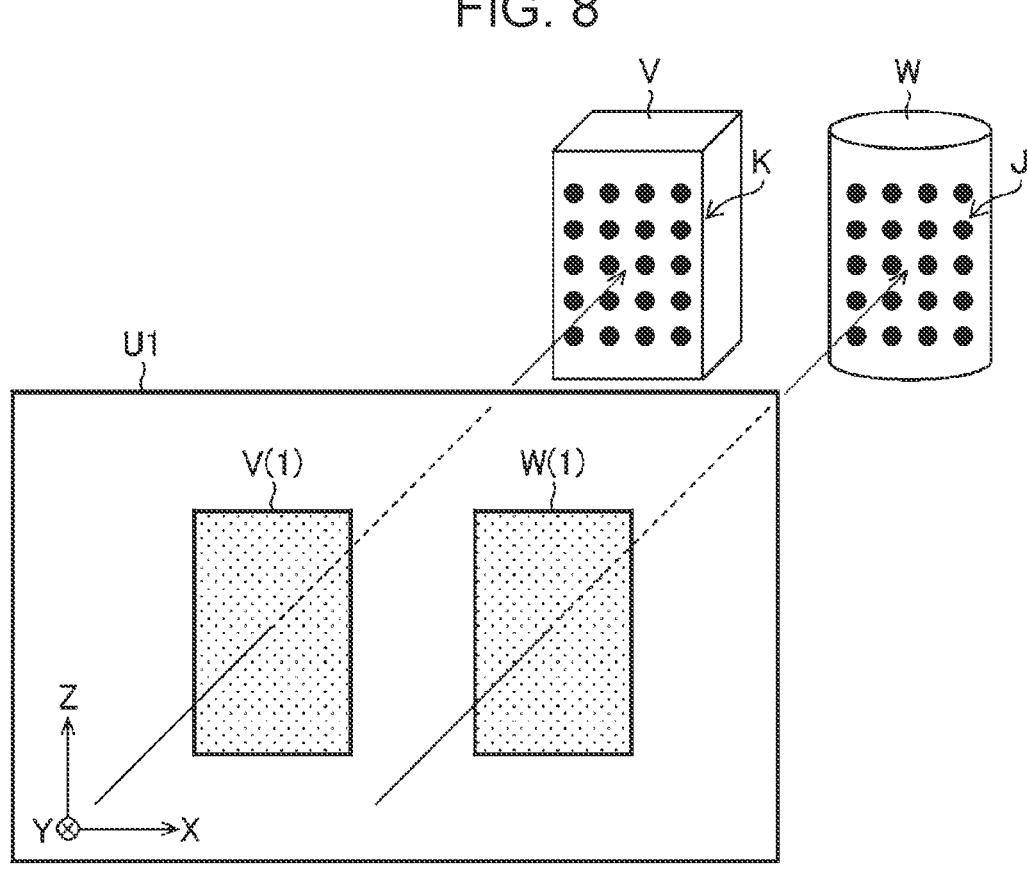
FIG. 8 is a diagram for explaining pieces of point cloud data selected on the basis of object regions.

FIG. 8 is a diagram for explaining pieces of point cloud data selected on the basis of object regions. FIG. 8 illustrates the object region V(1) and the object region W(1) specified on the image U1 in the object region specifying step. FIG. 8 further illustrates point cloud data K that corresponds to the object region V(1) and indicates three-dimensional information of the surface of the object V and point cloud data J that corresponds to the object region W(1) and indicates three-dimensional information of the surface of the object W.

Each pixel that constitutes the object region V(1) and the object region W(1) has a corresponding positional relationship with a piece of point data that constitutes a corresponding one of the pieces of point cloud data.

Specifically, each pixel that constitutes the object region V(1) has a corresponding positional relationship with a piece of point data that constitutes the point cloud data K, and each pixel that constitutes the object region W(1) has a corresponding positional relationship with a piece of point data that constitutes the point cloud data J.

Second Form Information Acquisition Step

The second form information acquisition step is performed by the second form information acquisition unit 37. The second form information acquisition unit 37 acquires form information (second form information) corresponding to the object region V(1) and the object region W(1) on the basis of the selected point cloud data K and point cloud data J.

The second form information acquisition unit 37 performs cylinder detection for the point cloud data K and the point cloud data J on the basis of the first form information "cylindrical form" acquired in advance and acquires second form information. An example of cylinder detection performed by the second form information acquisition unit 37 will be described below.

Figure 9:
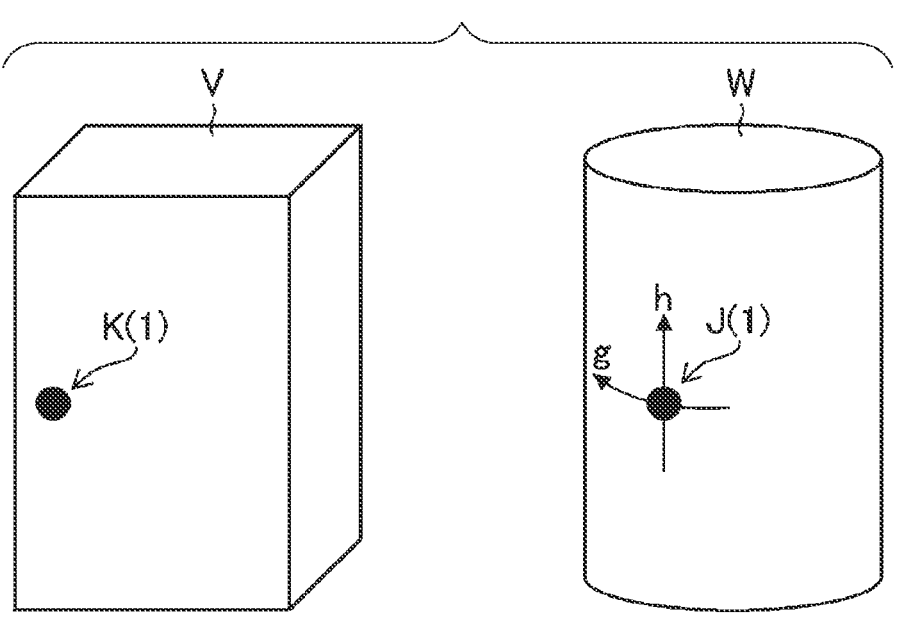
FIG. 9 is a diagram for explaining an example of cylinder detection performed by a second form information acquisition unit.

FIG. 9 is a diagram for explaining an example of cylinder detection performed by the second form information acquisition unit 37. The second form information acquisition unit 37 selects any one point from each of the point cloud data K and the point cloud data J. In the case illustrated in FIG. 9, point data K(1) is selected from the point cloud data K and point data J(1) is selected from the point cloud data J. Subsequently, the second form information acquisition unit 37 calculates principal curvatures (maximum curvature and minimum curvature) for the point data K(1) and the point data J(1). The second form information acquisition unit 37 extracts a point at which the minimum curvature is equal to 0 and the directions of the two principal curvatures intersect at right angles. In the case illustrated in FIG. 9, the point data K(1) is point data of the surface of the rectangular parallelepiped, and therefore, the direction of the maximum curvature and the direction of the minimum curvature do not intersect at right angles, and the minimum curvature is not equal to 0. In contrast, regarding the point data J(1), the maximum curvature direction g and the minimum curvature direction h intersect at right angles, and the minimum curvature is equal to 0. Accordingly, the second form information acquisition unit 37 acquires second form information indicating that "the point cloud data K does not have three-dimensional information of the surface of an object having a cylindrical form" and "the point cloud data J has three-dimensional information of the surface of an object having a cylindrical form". The method for cylinder detection described above is an example, and the second form information acquisition unit 37 can detect a cylinder with another method. For example, the second form information acquisition unit 37 may be formed of a detector subjected to machine learning and detect a cylinder by using the detector. The second form information acquisition unit 37 may perform robust estimation to thereby increase the detection accuracy. For example, the second form information acquisition unit 37 can increase the detection accuracy by using the RANSAC (Random Sample Consensus) algorithm.

Figure 10:
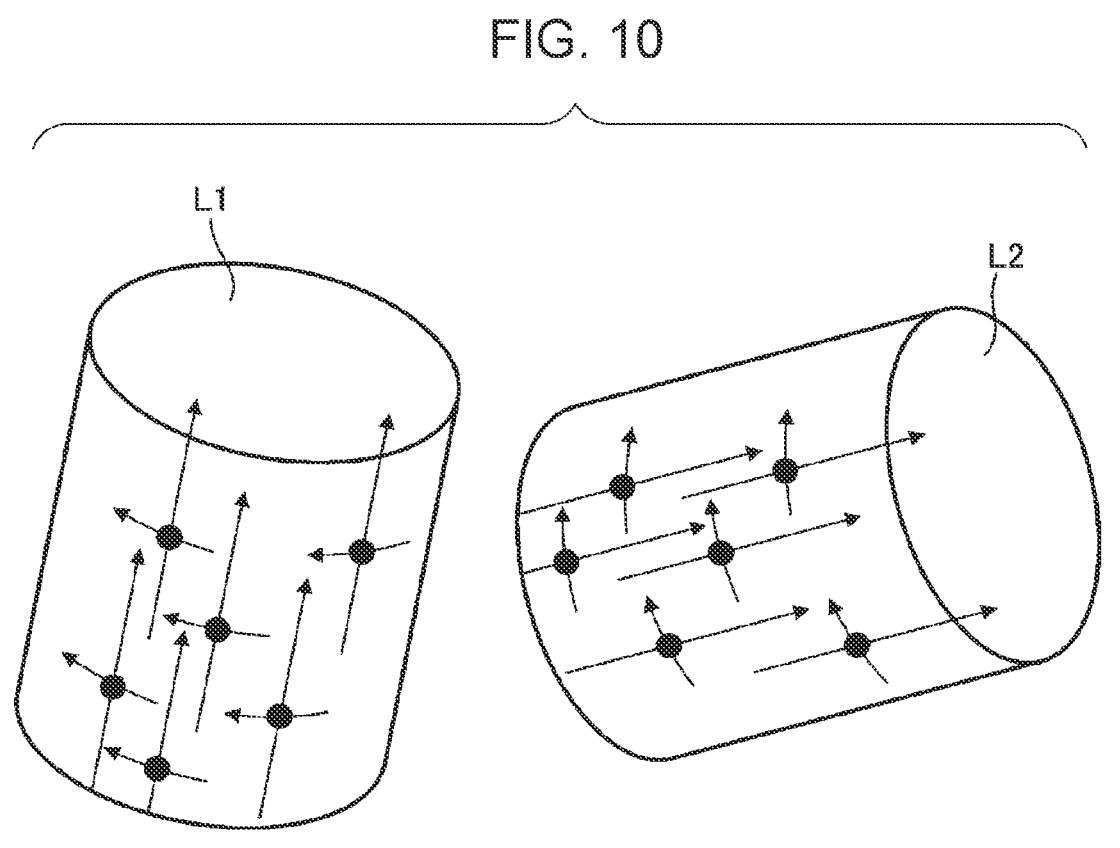

FIG. 10 is a diagram for explaining cylinder detection performed by using the RANSAC algorithm.

In the case illustrated in FIG. 10, for point cloud data having three-dimensional information of the surface of an object L1 having a cylindrical form and for point cloud data having three-dimensional information of the surface of an object L2 having a cylindrical form, the second form information acquisition unit 37 performs cylinder detection that is performed by using the RANSAC algorithm. The second form information acquisition unit 37 extracts a plurality of pieces of point data in each of which the maximum curvature direction and the minimum curvature direction intersect at right angles and the minimum curvature is equal to 0 by using the RANSAC algorithm as described above. The pieces of point data thus extracted have a feature that the maximum curvatures are similar to each other (the cylinder radii are similar to each other), a feature that the minimum curvature directions are similar to each other (the cylinder axial directions are similar to each other), or a feature of connectedness (nearby points having the same property, if any, can be connected to each other).

Note that the second form information acquisition unit 37 may perform cylinder detection by using a method using a Hough transformation process or a method that is a combination of the RANS AC algorithm and a Rough transformation process, instead of the above-described method.

Determination Step

The determination step is performed by the determination unit 39. The first form information acquired in the first form information acquisition step is compared with the second form information acquired in the second form information acquisition step to thereby determine whether the second object is the first object. That is, the determination unit 39 performs determination as to whether regions of the detection target object are specified and whether the specifying of the object region V(1) and the object region W(1) is correct or wrong.

Specifically, the determination unit 39 determines whether the first form information "cylindrical form" acquired in the first form information acquisition step matches the second form information acquired from the point cloud data K and the point cloud data J. The determination unit 39 compares the first form information "cylindrical form" with the second form information of the point cloud data K, that is, "the point cloud data K does not have three-dimensional information of the surface of an object having a cylindrical form", and determines that the second object corresponding to the object region V(1) is not the first object that is the detection target. The determination unit 39 compares the first form information "cylindrical form" with the second form information of the point cloud data J, that is, "the point cloud data J has three-dimensional information of the surface of an object having a cylindrical form", and determines that the second object corresponding to the object region W(1) is the first object that is the detection target. For example, the result of determination by the determination unit 39 is displayed on the display unit 9 in accordance with control by the display control unit 19 to give the user a notification. Accordingly, the user can recognize whether the regions specified by the object region specifying unit 33 are regions corresponding to the detection target object.

Attribute Assigning Step

The attribute assigning step is performed by the attribute assigning unit 41. The attribute assigning unit 41 assigns an attribute to the point cloud data J that is determined by the determination unit 39 to correspond to an object region corresponding to the detection target object. The attribute assigning unit 41 does not assign an attribute to the point cloud data K that is determined by the determination unit 39 to correspond to an object region not corresponding to the detection target object. For example, the attribute assigning unit 41 assigns an attribute "cylindrical form" to pieces of point data that constitutes the point cloud data J. Accordingly, the attribute assigning unit 41 can appropriately assign the attribute to the point cloud data of the detection target object.

As described above, for the object region V(1) and the object region W(1) that are determined to correspond to the detection target object having a cylindrical form from the image U1 and specified, determination as to whether the result of specification is correct or wrong is performed. Accordingly, the result of specifying the object region V(1) and the object region W(1) on the image U1 can be effectively used.

Others

In the embodiment described above, the hardware configuration of the control unit 17 (processing unit) and the display control unit 19 that perform various types of processing is implemented as various processors as described below. The various processors include a CPU (central processing unit) that is a general-purpose processor executing software (program) to function as various processing units, a programmable logic device (PLD), such as an FPGA (field-programmable gate array), that is a processor for which the circuit configuration can be changed after manufacturing, and a dedicated electric circuit, such as an ASIC (application-specific integrated circuit), having a circuit configuration that is designed only for performing a specific process.

One processing unit may be configured as one of the various processors or two or more processors of the same type or different types (for example, a plurality of FPGAs or a combination of a CPU and an FPGA). Further, a plurality of processing units may be configured as one processor. As the first example of configuring a plurality of processing units as one processor, a form is possible in which one or more CPUs and software are combined to configure one processor, and the processor functions as the plurality of processing units, a representative example of which is a computer, such as a client or a server. As the second example thereof, a form is possible in which a processor is used in which the functions of the entire system including the plurality of processing units are implemented as one IC (integrated circuit) chip, a representative example of which is a system on chip (SoC). As described above, regarding the hardware configuration, the various processing units are configured by using one or more of the various processors described above.

Further, the hardware configuration of the various processors is more specifically an electric circuit (circuitry) in which circuit elements, such as semiconductor elements, are combined.

The configurations and functions described above can be implemented as any hardware, software, or a combination thereof as appropriate. For example, the present invention is applicable to a program for causing a computer to perform the above-described processing steps (processing procedure), a computer-readable recording medium (non-transitory recording medium) to which the program is recorded, or a computer in which the program can be installed.

Although an example of the present invention has been described above, the present invention is not limited to the embodiment described above, and various modifications can be made without departing from the spirit of the present invention as a matter of course.

REFERENCE SIGNS LIST

1 three-dimensional measuring device
5 image
7 point cloud data
9 display unit
11 point cloud data processing apparatus
13 image acquisition unit
15 point cloud data acquisition unit
17 control unit
19 display control unit
21 storage unit
23 operation unit
31 first form information acquisition unit
33 object region specifying unit
35 point cloud data selection unit
37 second form information acquisition unit
39 determination unit
41 attribute assigning unit
101 laser scanner
102 image capturing device
103 half mirror

What is claimed is:

1. A point cloud data processing apparatus comprising:
a memory configured to store an image of a first object that is a detection target and that is a photographic subject and point cloud data that includes a large number of points on a surface of the first object and that represents at least three-dimensional information, in association with positions of pixels that constitute the image and pieces of point data that constitute the point cloud data; and
a processor,
the processor being configured to
acquire first form information that indicates a feature of a form of the first object,
specify an object region of a second object that is identified from the image and that corresponds to the first form information,
select, on the basis of positions of pixels of the object region, second-object point cloud data corresponding to the object region that is stored in association with the positions of the pixels of the object region in the point cloud data stored in the memory,
acquire second form information that indicates a feature of a form of the second object, on the basis of the second-object point cloud data, and
compare the first form information with the second form information and perform determination as to whether the second object is the first object,
wherein the first form information includes, of information about a type of the form of the first object, information about the surface of the first object, and information about a size of the first object, at least the information about the type of the form of the first object, the first object that is the detection target has a cylindrical form, a rectangular parallelepiped form, or a spherical form, and the processor is configured to calculate a maximum curvature and a minimum curvature that are principal curvatures of the second object on the basis of the second-object point cloud data and acquire the second form information from the calculated maximum curvature and minimum curvature, or input the second-object point cloud data to a detector subjected to machine learning and acquire the second form information from a result output from the detector.

2. The point cloud data processing apparatus according to claim 1, wherein the processor is configured to assign an attribute to the second-object point cloud data on the basis of a result of the determination.

3. The point cloud data processing apparatus according to claim 1, wherein the processor is configured to cause a display unit to display a result of the determination.

4. The point cloud data processing apparatus according to claim 2, wherein the processor is configured to cause a display unit to display a result of the determination.

5. The point cloud data processing apparatus according to claim 1, wherein the form of the first object is a cylindrical form.

6. The point cloud data processing apparatus according to claim 2, wherein the form of the first object is a cylindrical form.

7. The point cloud data processing apparatus according to claim 3, wherein the form of the first object is a cylindrical form.

8. The point cloud data processing apparatus according to claim 5, wherein the processor is configured to acquire the second form information on the basis of the second-object point cloud data by at least one of a Hough transformation process, a RANSAC algorithm, or a detector subjected to machine learning.

9. The point cloud data processing apparatus according to claim 1, wherein the first object is piping.

10. The point cloud data processing apparatus according to claim 2, wherein the first object is piping.

11. The point cloud data processing apparatus according to claim 3, wherein the first object is piping.

12. The point cloud data processing apparatus according to claim 5, wherein the first object is piping.

13. The point cloud data processing apparatus according to claim 8, wherein the first object is piping.

14. A point cloud data processing method using a point cloud data processing apparatus comprising: a memory configured to store an image of a first object that is a detection target and that is a photographic subject and point cloud data that includes a large number of points on a surface of the first object and that represents at least three-dimensional information, in association with positions of pixels that constitute the image and pieces of point data that constitute the point cloud data; and a processor, the processor being configured to perform a step of acquiring first form information that indicates a feature of a form of the first object, a step of specifying an object region of a second object that is identified from the image and that corresponds to the first form information, a step of selecting second-object point cloud data, in the point cloud data, that corresponds to the object region, on the basis of the object region, a step of selecting, on the basis of positions of pixels of the object region, second-object point cloud data corresponding to the object region that is stored in association with the positions of the pixels of the object region in the point cloud data stored in the memory, a step of acquiring second form information that indicates a feature of a form of the second object, on the basis of the second-object point cloud data, and a step of comparing the first form information with the second form information and performing determination as to whether the second object is the first object, wherein the first form information includes, of information about a type of the form of the first object, information about the surface of the first object, and information about a size of the first object, at least the information about the type of the form of the first object, the first object that is the detection target has a cylindrical form, a rectangular parallelepiped form, or a spherical form, and the processor is configured to further perform a step of calculating a maximum curvature and a minimum curvature that are principal curvatures of the second object on the basis of the second-object point cloud data and acquiring the second form information from the calculated maximum curvature and minimum curvature, or inputting the second-object point cloud data to a detector subjected to machine learning and acquiring the second form information from a result output from the detector.

15. A non-transitory computer recording medium storing a program for causing a point cloud data processing apparatus to perform a point cloud data processing method, the point cloud data processing apparatus comprising: a memory configured to store an image of a first object that is a detection target and that is a photographic subject and point cloud data that includes a large number of points on a surface of the first object and that represents at least three-dimensional information, in association with positions of pixels that constitute the image and pieces of point data that constitute the point cloud data; and a processor, the program causing the processor to perform a step of acquiring first form information that indicates a feature of a form of the first object, a step of specifying an object region of a second object that is identified from the image and that corresponds to the first form information, a step of selecting, on the basis of positions of pixels of the object region, second-object point cloud data corresponding to the object region that is stored in association with the positions of the pixels of the object region in the point cloud data stored in the memory, a step of acquiring second form information that indicates a feature of a form of the second object, on the basis of the second-object point cloud data, and a step of comparing the first form information with the second form information and performing determination as to whether the second object is the first object, wherein the first form information includes, of information about a type of the form of the first object, information about the surface of the first object, and information about a size of the first object, at least the information about the type of the form of the first object, the first object that is the detection target has a cylindrical form, a rectangular parallelepiped form, or a spherical form, and the program causes the processor to further perform a step of calculating a maximum curvature and a minimum curvature that are principal curvatures of the second object on the basis of the second-object point cloud data and acquiring the second form information from the calculated maximum curvature and minimum curvature, or inputting the second-object point cloud data to a detector subjected to machine learning and acquiring the second form information from a result output from the detector.

16. The point cloud data processing apparatus according to claim 1, wherein the first form information includes at least information about a type of the form of the first object.

* * * * *